United States Patent Office 3,814,723
Patented June 4, 1974

3,814,723
HEAT-SHRINKABLE AND FLAME-RETARDANT
SILICONE RUBBER COMPOSITIONS
Kiyoshi Yokokawa and Yasuhisa Tanaka, Annaka, Japan, assignors to Shinetsu Chemical Company, Tokyo, Japan
No Drawing. Filed July 12, 1972, Ser. No. 271,184
Int. Cl. C08g 51/04, 47/00
U.S. Cl. 260—37 SB                6 Claims

ABSTRACT OF THE DISCLOSURE

Heat-shrinkable and flame-retardant silicone rubber compositions comprising: (1) 100 parts by weight of a diorganopolysiloxane gum consisting of 99.7 mol percent dimethylsiloxy unit and 0.3 mol percent methylvinylsiloxy unit; (2) 43 parts by weight of fume silica; (3) 25 parts by weight of an organopolysiloxane resin consisting of 37 mol percent phenylsiloxy unit, 25 mol percent methylsiloxy unit, 19 mol percent diphenylsiloxy unit, 17 mol percent dimethylsiloxy unit and 2.0 mol percent methylvinylsiloxy unit, and having a softening point of 84–89° C.; (4) 1 part by weight of trimethylsilyl end-stopped methyl-hydrogen polysiloxane; and (5) catalytic amount of chloroplatinic acid. These compositions are molded into various shapes and cured. The molded and cured articles are stretched at a certain temperature and then cooled to room temperature in their stretched condition. The resulting articles have such properties as distinguished in heat-shrinkage, flame-retardancy, mechanical strength, water proofness, and electrical properties.

SUMMARY OF THE INVENTION

This invention relates to silicone rubber compositions that are capable of imparting improved heat-shrinkability and flame-retardancy to articles made therefrom.

BACKGROUND OF THE INVENTION AND PRIOR ART

It is known from, for example, British patent specification 1,010,064 and U.S. Pat. 3,360,496 that organopolysiloxane gums mixed with certain thermoplastic or silicone resins can produce heat-shrinkable products. However, articles made from conventional compositions, such as polysiloxane gums blended with either polyethylene or polyvinyl chloride, molded and stretched, have inferior heat-shrinkable properties for long periods of time under storage conditions as well as in thermal stability, while any ones prepared from ordinary silicone resins or block siloxane polymers blended with polysiloxane gums have inferior mechanical strength and flame-retardant properties. Conventional heat-shrinkable compositions are mere blends of various materials and any products made therefrom have such defects as poor heat-shrinkability and mechanical strength. They are, at the same time, inferior in water proofness and also in the electrical properties.

OBJECTS OF THE INVENTION

It is an object of this invention to provide silicone rubber compositions comprising an organopolysiloxane gum and an organopolysiloxane resin chemically bondable thereto, which are useful for making articles, molded and cured, having excellent heat-shrinkability for long storage periods, mechanical strength, water-proofness, ability to retard burning, and electrical properties.

It is another object of the invention to provide articles having the above-mentioned properties.

Other objects of the invention and the advantages thereof will be apparent from the following description.

DESCRIPTION OF THE INVENTION

The silicone rubber composition of the invention comprises:

(1) 100 parts by weight of a diorganopolysiloxane, having a viscosity of at least 1,000 cs. at 25° C., represented by the average unit formula

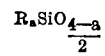

where R is a substituted or unsubstituted monovalent hydrocarbon radical selected from the group consisting of vinyl radicals, methyl radicals, phenyl radicals, ethyl radicals, propyl radicals, and 3,3,3-trifluoropropyl radicals, from 0.05 to 0.5 mol percent of it being a vinyl radical and at least 50 mol percent of the remainder being a methyl radical, and $a$ has an average value of from 1.9 to 2.1;

(2) From 10 to 70 parts by weight of an organopolymethy radical, and a has an average value of from 1.9 siloxane resin, having a softening point of from 70 to 150° C., represented by the average unit formula

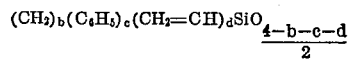

where $b$ has a value of from 0.3 to 1.0, $c$ has a value of from 0.3 to 1.5, and $d$ has a value of from 0.001 to 0.05, with the proviso that the sum of $b+c+d$ is a value of from 1.2 to 1.8;

(3) From 0.1 to 10 parts by weight of an organohydrogen polysiloxane represented by the average unit formula

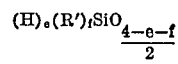

where R′ is a monovalent hydrocarbon radical, $e$ has a value equal to or greater than 0.1, and $f$ has such a value that the sum of $e+f$ is from 1.0 to 2.1; and (4) a catalytic amount of a platinum-containing catalyst.

To give more detailed descriptions of the compositions of the invention, the first component is a diorganopolysiloxane gum having a viscosity of at least 1,000 cs. at 25° C., preferably at least 100,000 cs. The diorganopolysiloxane is employed as a major material for the production of an ordinary silicone rubber. It is either straight or nearly straight chained, with the molecular chains terminated by hydroxy, vinyl, or alkyl radicals, from 0.05 to 0.5 mol percent of the whole organic radicals (substituted or unsubstituted monovalent hydrocarbon radicals) bonded to silicon atoms in the molecules consisting of vinyl radicals and at least 50 mol percent of the remaining organic radicals consisting of methyl radicals.

The second component is a material which is required for retaining the excellent heat-shrinkable properties in articles to be made from the compositions of the invention. It being an organopolysiloxane resin represented by the afore-mentioned average unit formula is prepared by cohydrolyzing and condensating the various silane monomers, at desired proportions, such as $SiX_4$, $CH_3SiX_3$, $(CH_3)_2SiX_2$, $(CH_3)_3SiX$, $C_6H_5SiX_3$, $(C_6H_5)_2SiX_2$, $(CH_3)(C_6H_5)SiX_2$, $(CH_3)(CH_2=CH)SiX_2$, and $(CH_3)_2(CH_2=CH)SiX$, where X is a hydrolyzable radical, such as Cl, OH, $OC_2H_5$, and $OC_3H_7$. In order to impart superior heat resistance and mechanical strength to the molded articles which retain the excellent heat-shrinkability under ordinary storage conditions, the values of $b$, $c$ and $d$ in the average unit formula must be between 0.3 and 1.0, 0.3 and 1.5, and 0.001 and 0.05, respectively, with the proviso that $b+c+d$ is equal to from 1.2 to 1.8 and, at the same time, the organopolysiloxane resin must have a softening point of from 70 to 150° C. The effects given by the addition of the second component are presumed to be brought about mainly by the presence of vinyl radicals bonded to silicon atoms. It should be noted in this connection that if the rate of vinyl radical content in the organopolysiloxane resin is too high, products to be made from the compositions of the invention will have inferior elongations and tensile strengths, while if it is too low, the objects of the invention, in which a chemical bondage takes place between the first and second components, resulting in the preparation of silicone rubber compositions useful for producing molded products having the heat-shrinkable and other properties, may not be attained. Thus, the coefficient $d$, which indicates the amount of vinyl radicals contained in the organopolysiloxane resin, should have a value between 0.001 and 0.05, or such amount of the vinyl radicals is in the range of from 0.1 to 5 mol percent.

The third component is a known additive which serves to cure the first component. It is prepared by hydrolyzing and condensating, for example, silane monomers, such as $HSiX_3$, $H(CH_3)SiX_2$, and $H(CH_3)_2SiX$, or by cohydrolyzing and condensating mixtures of the various silane monomers employed in the preparation of the second component. For this third component to function effectively as a curing agent, the coefficient $e$ should have a value equal to or greater than 0.1 and $f$ should have such a value that the sum of $e$ and $f$ is from 1.0 to 2.1 in the formula.

Next, the fourth component which is a catalytic platinum or platinum compound. It may be any one of platinum metals or platinum compounds usually employed in the SiH-olefin addition reaction. Among the many useful catalysts for this reaction are finely divided platinum as described in U.S. Pat. 2,970,150, Bailey, chloroplatinic acid as described in U.S. Pat. 2,823,218, Speier et al., the reaction products of chloroplatinic acid with either an alcohol, an ether, or an aldehyde as described in U.S. Pat. 3,220,972, Lamoreaux, trimethylplatinum iodide and hexamethyldiplatinum as described in U.S. Pat. 3,313,-773, Lamoreaux, the platinum-olefin complex catalysts as described in U.S. Pat. 3,159,601, Ashby, and the platinum-cyclopropane complex catalysts as described in U.S. Pat. 3,159,662, Ashby. In general, amounts of from 0.01 to 250 p.p.m. by weight of platinum based on the total weight of curable composition present, can be used. Preferably, the amount is from 0.01 to 10 p.p.m. as platinum based on the total weight of the polysiloxane. The catalyst can be employed in amounts greater than 250 p.p.m. by weight of platinum, but due to the cost of the materials, utilization of greater than 250 p.p.m. is not preferred.

In addition to the above-described first to fourth components, suitable fillers may be employed. Those fillers can be any of the standard fillers normally employed with silicone rubber. These include the so-called reinforcing fillers, such as finely divided silica exemplified by fume silica, precipitated silica or silica aerogel, diatomaceous earth, calcium carbonate, titanium white, alumina, quartz powder, iron oxide, and carbon black.

The compositions of the present invention are prepared by uniformly mixing all of the components and, if desired, a filler, described above. In order to attain the objects of the invention most advantageously, the mixing proportions of the major components should be, by weight, 100 parts of the first component, from 10 to 70 parts of the second component, from 0.1 to 10 parts of the third component, and a catalytic amount of the fourth component. Particularly speaking of the second component, if its amount is smaller than 10 parts, the molded products made from the composition could hardly be stretched, although it is superior in tensile strength, while, if it is larger than 70 parts, the products would become inferior in both tensile strength and heat-shrinkability, the optimum amount being in the range of from 15 to 50 parts. As to the mixing of these various components, there is no particular order, but, usually, the first and second components, are mixed first and added with a filler, if used and then to the mixture are added the third and fourth components to be kneaded together on rolls. Any other additives such as heat-resistance-improving and coloring agents may be employed at this kneading stage.

The compositions thus prepared are molded into such various shapes as tubes, pipes, sheets and the like, and cured under the atmospheric pressure or a higher pressure at a temperature not lower than 100° C. for a period of from 15 seconds to 30 minutes, with postcuring, if required, to obtain cured articles. These cured articles can be stretched or prolonged at a temperature of, for example, from 120 to 220° C. and then cooled in their stretched condition to obtain heat-shrinkable products. The stretches and prolongations may be conducted by any methods which have been usually employed on thermoplastic resins, for example, a method wherein a molded pipe is placed inside of another pipe having a greater diameter up to which it is intended to be stretched and pressed outwards from inside while being heated, a method wherein a mandrel is used, or a method wherein films or sheets are prolonged while being heated.

The articles thus produced are capable of being shrunken to substantially their original dimensions before stretching upon being heated up to over 100° C. by means of hot blow or other heating means. Further, they are distinguished in mechanical strength and storage stability over similar conventional products.

DESCRIPTION OF SPECIFIC EMBODIMENTS

The invention will now be more fully described with respect to the following illustrative examples. In the examples, parts are all parts by weight.

Examples 1–19

To each mixture of 100 parts diorganopolysiloxane consisting of 99.7 mol percent $(CH_3)_2SiO$ unit and 0.3 mol percent $(CH_3)(CH_2=CH)SiO$ unit and 43 parts fumed silica was added 35.8 parts each of the different organopolysiloxane resins which will be hereinafter identified. These mixtures were applied to kneaders. Thereafter, each of the mixtures was added with 1.43 part trimethylsilyl end-stopped methylhydrogen polysiloxane, containing 50 mol percent $H(CH_3)SiO$ unit and having a polymerization degree of 40, and 0.143 part 1 percent methanol solution of chloroplatinic acid and further mixed on a two-roll roller, to form a sheet. The sheets thus obtained were heated at 150° C. for 10 minutes and subsequently at 200° C. for 2 hours to be cured. The resulting cured sheets were elongated 200% (or, three times their original lengths) at 150° C. The sheets were subjected to cooling down to room temperature and the stress was relieved. The sheets were then allowed to stand at room temperature for one hour.

Table 1 to follow shows the values of stretch retention rate, percent heat-shrinkage, hardness, tensile strength, and percent elongation as well as the ranking of flame retardancy, measured on each finished product. In this table, the percentages for the stretch retention rate and the heat shrinkage were determined by the formula $$\frac{L-Lo}{L_{max}-Lo} \times 100 \text{ and } \frac{Ls-Lo}{Eo} \times 100$$

respectively, where Lo is the length of the sheet before it is stretched; $L_{max.}$ is the length of the sheet stretched 200%; L is the length of the sheet after having been cooled and allowed to stand for one hour at room temperature, and Ls is the length of the sheet after it has been heat-shrunken. The rankings of flame retardancy are determined by U.S. Standard UL–492; B is for "burning" and SE–2 is for "self-extinguishing in a length of time exceeding 25 seconds."

The organopolysiloxane resins used in these examples are as follows:

Organopolysiloxane resin A (Cohydrolyzed resin)

Composition:
$CH_3SiO_{1.5}$ unit: 20 mol percent
$SiO_2$ unit: 30 mol percent
$(CH_3)_3SiO_{0.5}$ unit: 49 mol percent
$(CH_3)_2(CH_2=CH)SiO$ unit: 1 mole percent
Softening point: 100–105° C.

Organopolysiloxane resin B (Cohydrolyzed resin)

Composition:
$CH_3SiO_{1.5}$ unit: 50 mol percent
$C_6H_5SiO_{1.5}$ unit: 20 mol percent
$(CH_3)_2SiO$ unit: 29 mol percent
$(CH_3)(CH_2=CH)SiO$ unit: 1 mol percent
Softening point: 98–100° C.

Orangopolysiloxane resin C (Cohydrolyzed resin)

Composition:
$CH_3SiO_{1.5}$ unit: 50 mol percent
$C_6H_5SiO_{1.5}$ unit: mol percent
$(CH_3)_2SiO$ unit: 20 mol percent
$(C_6H_5)_2SiO$ unit: 9 mol percent
$(CH_3)(CH_2=CH)SiO$ unit: 1 mol percent
Softening point: 101–106° C.

Organopolysiloxane resin D (Cohydrolyzed resin)

Composition:
$CH_3SiO_{1.5}$ unit: 50 mol percent
$C_6H_5SiO_{1.5}$ unit: 20 mol percent
$(CH_3)_2SiO$ unit: 18 mol percent
$(C_6H_5)_2SiO$ unit: 9 mol percent
$(CH_3)(CH_2=CH)SiO$ unit: 3 mol percent
Softening point: 100–104° C.

Organopolysiloxane resin E (Cohydrolyzed resin)

Composition:
$C_6H_5SiO$ unit: 37 mol percent
$CH_3SiO_{1.5}$ unit: 25 mol percent
$(C_6H_5)_2SiO$ unit: 19 mol percent
$(CH_3)_2SiO$ unit: 19 mol percent
Softening point 86–90° C.

Organopolysiloxane resin F (Cohydrolyzed resin)

Composition:
$C_6H_5SiO_{1.5}$ unit: 37 mol percent
$CH_3SiO_{1.5}$ unit: 25 mol percent
$(C_6H_5)_2SiO$ unit: 19 mol percent
$(CH_3)_2SiO$ unit: 18.5 mol percent
$(CH_3)(CH_2=CH)SiO$ unit: 0.5 mol percent
Softening point: 86–90° C.

Organopolysiloxane resin G (Cohydrolyzed resin)

Composition:
$C_6H_5SiO_{1.5}$ unit: 37 mol percent
$CH_3SiO_{1.5}$ unit: 25 mol percent
$(C_6H_5)_2SiO$ unit: 19 mol percent
$(CH_3)_2SiO$ unit: 18 mol percent
$(CH_3)(CH_2=CH)SiO$ unit: 1 mol percent
Softening point: 86–90° C.

Organopolysiloxane resin H (Cohydrolyzed resin)

Composition:
$C_6H_5SiO_{1.5}$ unit: 37 mol percent
$CH_3SiO_{1.5}$ unit: 25 mol percent
$(C_6H_5)_2SiO$ unit: 19 mol percent
$(CH_3)_2SiO$ unit: 17 mol percent
$(CH_3)(CH_2=CH)SiO$ unit: 2.0 mol percent
Softening point: 84–89° C.

Organopolysiloxane resin I (Cohydrolyzed resin)

Composition:
$C_6H_5SiO_{1.5}$ unit: 37 mol percent
$CH_3SiO_{1.5}$ unit: 25 mol percent
$(C_6H_5)_2SiO$ unit: 19 mol percent
$(CH_3)_2SiO$ unit: 15 mol percent
$(CH_3)(CH_2=CH)SiO$ unit: 4 mol percent
Softening point: 83–88° C.

Organopolysiloxane resin J (Cohydrolyzed resin)

Composition:
$C_6H_5SiO_{1.5}$ unit: 37 mol percent
$CH_3SiO_{1.5}$ unit: 25 mol percent
$(C_6H_5)_2SiO$ unit: 19 mol percent
$(CH_3)_2SiO$ unit: 14 mol percent
$(CH_3)(CH_2=CH)SiO$ unit: 5 mol percent
Softening point: 83–88° C.

Organopolysiloxane resin K (Cohydrolyzed resin)

Composition:
$C_6H_5SiO_{1.5}$ unit: 37 mol percent
$CH_3SiO_{1.5}$ unit: 25 mol percent
$(C_6H_5)_2SiO$ unit: 19 mol percent
$(CH_3)_2SiO$ unit: 13 mol percent
$(CH_3)(CH_2=CH)SiO$ unit: 6 mol percent
Softening point: 81–84° C.

Organopolysiloxane resin L (Cohydrolyzed resin)

Composition:
$C_6H_5SiO_{1.5}$ unit: 70 mol percent
$(CH_3)_2SiO$ unit: 20 mol percent
$(C_6H_5)_2SiO$ unit: 10 mol percent
Softening point: 120–130° C.

Organopolysiloxane resin M (Cohydrolyzed resin)

Composition:
$C_6H_5SiO_{1.5}$ unit: 70 mol percent
$(CH_3)_2SiO$ unit: 18 mol percent
$(C_6H_5)_2SiO$ unit: 10 mol percent
$(CH_3)(CH_2=CH)SiO$ unit: 2 mol percent
Softening point: 115–120° C.

Organopolysiloxane resin N (Cohydrolyzed resin)

Composition:
$C_6H_5SiO_{1.5}$ unit: 70 mol percent
$(CH_3)_2SiO$ unit: 16 mol percent
$(C_6H_5)_2SiO$ unit: 10 mol percent
$(CH_3)(CH_2=CH)SiO$ unit: 4 mol percent
Softening point: 115–120° C.

Organopolysiloxane resin O (Cohydrolyzed resin)

Composition:
$C_6H_5SiO_{1.5}$ unit: 70 mol percent
$(CH_3)_2SiO$ unit: 10 mol percent
$(C_6H_5)_2SiO$ unit: 20 mol percent
Softening point: 125–130° C.

Organopolysiloxane resin P (Cohydrolyzed resin)

Composition:
$C_6H_5SiO_{1.5}$ unit: 70 mol percent
$(CH_3)_2SiO$ unit: 7 mol percent
$(C_6H_5)_2SiO$ unit: 20 mol percent
$(CH_3)(CH_2=CH)SiO$ unit: 3 mol percent
Softening point: 120–125° C.

Organopolysiloxane resin Q (Cohydrolyzed resin)

Composition:
$C_6H_5SiO_{1.5}$ unit: 70 mol percent
$(C_6H_5)_2SiO$ unit: 27 mol percent
$(CH_3)(CH_2=CH)SiO$ unit: 3 mol percent
Softening point: 130–135° C.

Organopolysiloxane resin R (Block polymer)

Composition:
  $C_6H_5SiO_{1.5}$ unit: 45 mol percent
  $(C_6H_5)_2SiO$ unit: 5 mol percent
  $(CH_3)_2SiO$ unit (Polymerization degree: 35): 50 mol percent
Softening point: No definite softening point Organopolysiloxane resin S (Block polymer)

Composition:
  $C_6H_5SiO$ unit: 55 mol percent
  $(CH_3)_2SiO$ unit (Polymerization degree: 20): 45 mol percent
Softening point: No definite softening point utes. The various properties of the resulting sheets are as follows:

Hardness _____ 58
Tensile strength (kg./cm.²) _____ 76.5
Elongation (percent) _____ 480
Stretch retention rate (percent) _____ 88
Heat shrinkage (percent) _____ 3
Flame retardancy (UL-492) _____ *SE-1

*Self-extinguishing within 25 seconds.

Example 28

To a mixture of 100 parts an organopolysiloxane gum consisting of 96.7 mol percent $(CH_3)SiO$ unit, 3.0 mol percent $(C_6H_5)_2SiO$ unit, and 0.3 mol percent

TABLE 1

| Example number | Organopolysiloxane resin | Stretch retention rate (%) | Heat shrinkage (%) | Hardness | Tensile strength (kg./cm.²) | Elongation (%) | Flame retardancy |
|---|---|---|---|---|---|---|---|
| 1* | A | 12 | 0 | 61 | 95 | 550 | B |
| 2* | B | 57 | 0 | 58 | 89 | 530 | B |
| 3 | C | 86 | 3 | 60 | 81 | 490 | B |
| 4 | D | 84 | 4 | 60 | 84 | 570 | B |
| 5* | E | 89 | 0 | 62 | 49 | 520 | B |
| 6 | F | 87 | 0 | 59 | 69 | 530 | B |
| 7 | G | 86 | 2 | 58 | 73 | 530 | SE-2 |
| 8 | H | 86 | 2 | 60 | 81 | 500 | SE-2 |
| 9 | I | 83 | 4 | 60 | 79 | 490 | SE-2 |
| 10 | J | 84 | 0 | 58 | 63 | 560 | SE-2 |
| 11* | K | 79 | 7 | 56 | 51 | 580 | B |
| 12* | L | 88 | 0 | 62 | 43 | 480 | SE-2 |
| 13 | M | 86 | 0 | 59 | 70 | 510 | SE-2 |
| 14 | N | 85 | 2 | 58 | 67 | 520 | SE-2 |
| 15* | O | 89 | 0 | 64 | 37 | 440 | SE-2 |
| 16* | P | 86 | 4 | 61 | 52 | 490 | SE-2 |
| 17* | Q | 85 | 4 | 61 | 49 | 500 | SE-2 |
| 18* | R | 60 | 10 | 64 | 49 | 500 | B |
| 19* | S | 54 | 14 | 66 | 53 | 460 | B |

* Control.

Examples 20-26

The procedure of Example 8 in which organopolysiloxane resin H was used was repeated with varied amounts of the resin. Results of these tests are shown in the following Table 2.

TABLE 2

| Ex. No. | Organopolysiloxane resin H (parts) | Stretch retention rate (percent) | Heat shrinkage (percent) | Hardness | Tensile strength (kg./cm.²) | Elongation (percent) |
|---|---|---|---|---|---|---|
| 20 | 0 | 2 | 0 | 55 | 106 | 550 |
| 21 | 14.3 | 34 | 0 | 55 | 95 | 550 |
| 22 | 25.5 | 56 | 0 | 56 | 93 | 560 |
| 23 | 28.6 | 72 | 0 | 57 | 87 | 540 |
| 24 | 50.0 | 88 | 4 | 63 | 72 | 490 |
| 25 | 64.5 | 91 | 15 | 71 | 59 | 420 |
| 26 | 78.5 | 94 | 18 | 77 | 48 | 340 |

Example 27

To a mixture of 100 parts an organopolysiloxane gum consisting of 98.35 mol percent $(CH_3)_2SiO$ unit, 1.5 mol percent $(C_6H_5)_2SiO$ unit, and 0.15 mol percent $$CH_2=CH(CH_3)SiO$$

unit and 43 parts silica, having a surface area of about 200 m.²/g. was added 35.8 parts the organopolysiloxane resin H of Example 8. The mixture was well kneaded on a mill at 120° C. Thereafter, the kneaded mixture was added with 1.43 part the same methylhydrogen polysiloxane as used in Example 8 and 0.00143 part chloroplatinic acid, and completely kneaded on a cool roll to yield sheets of about 2 mm. thick. These sheets were then cured at 200° C. under atmospheric pressure for 30 min- $$CH_3CH_2=CHSiO$$

unit and 38.5 parts of silica having a surface area of about 300 m.²/g. which had been treated with trimethylsiloxane and 15.4 parts of diatomaceous earth was added 38.5 parts the organopolysiloxane resin M of Example 13. Sheets were then made from this formulation according to the procedure similar to Example 27, with the following properties.

Hardness _____ 62
Tensile strength (kg./cm.²) _____ 64.5
Elongation (percent) _____ 390
Stretch retention rate (percent) _____ 89
Heat shrinkage (percent) _____ 5
Flame retardancy (UL-492) _____ SE-1

Example 29

To a mixture of 100 parts an organopolysiloxane gum consisting of 94.5 mol percent $(CH_3)_2SiO$ unit, 5 mol percent $(C_6H_5)_2SiO$ unit, and 0.5 mol percent $$CH_2=CH(CH_3)SiO$$

unit and 40 parts fumed silica having a surface area of about 200 m.²/g., 20 parts precipitated silica having a surface area of about 250 m.²/g., and 40 parts of fumed silica was added 40 parts of the organopolysiloxane resin N of Example 14. Sheets were then prepared from this formulation similarly in Example 27, with the following properties determined.

Hardness _____ 72
Tensile strength (kg./cm.²) _____ 57.5
Elongation (percent) _____ 310
Stretch retention rate _____ 92
Heat shrinkage (percent) _____ 8
Flame retardancy (UL-492) _____ *SE-0

*Self-extinguishing within 10 seconds.

Example 30

The formulated composition of Example 27 was applied to a screw extruder having the inside diameter of 50 mm. and the length of 500 mm. to make tubes of 4 mm. inside diameter and 6 mm. outside diameter. These tubes were cured through an oven kept at 200° C., and then stretched by placing them inside of a stainless steel pipe of 12.7 mm. inside diameter and introducing air-pressure of about 2.5 kg./cm.² into the inside of the tubes at 150° C. The tubes thus stretched were measured 10.2 mm. outside diameter and 8.8 mm. inside diameter and, upon heating at 150° C., became shrunken to 4.1 mm. inside diameter and 6.0 mm. outside diameter.

What is claimed is:

1. A composition of matter which exhibits improved heat-shrinkable and flame-retardant properties in a cured state, which composition comprises:
   (1) 100 parts by weight of a diorganopolysiloxane gum having a viscosity of at least 1,000 cs. at 250° C., represented by the average unit formula $$R_a SiO_{\frac{4-a}{2}}$$

where R is a substituted or unsubstituted monovalent hydrocarbon radical, from 0.05 to 0.5 mol percent of it consisting of vinyl radicals and at least 50 mol percent of the remainder consisting of methyl radicals, and a has an average value of from 1.9 to 2.1,
   (2) from 10 to 70 parts by weight of an organopolysiloxane resin, having a softening point of from 70 to 150° C., represented by the average unit formula $$(CH_3)_b(C_6H_5)_c(CH_2=CH)_d SiO_{\frac{4-b-c-d}{2}}$$

where b has a value of from 0.3 to 1.0, c has a value of from 0.3 to 1.5, and d has a value of from 0.001 to 0.05, with the proviso that the sum of b plus c plus d is a value of from 1.2 to 1.8,
   (3) from 0.1 to 10 parts by weight of an organohydrogen polysiloxane represented by the average unit formula $$(H)_e(R')_f SiO_{\frac{4-e-f}{2}}$$

where R' is a monovalent hydrocarbon radical, e has a value equal to or greater than 0.1, and f has such a value that the sum of e plus f is from 1.0 to 2.1, and
   (4) a catalytic amount of a platinum-containing catalyst.

2. A composition of matter which exhibits improved heat-shrinkable and flame-retardant properties in a cured state, which composition comprises:
   (1) 100 parts by weight of a diorganopolysiloxane gum having a viscosity of at least 1,000 cs. at 25° C., represented by the average unit formula $$R_a SiO_{\frac{4-a}{2}}$$

where R is a substituted or unsubstituted monovalent hydrocarbon radical, from 0.05 to 0.5 mol percent of it consisting of vinyl radicals and at least 50 mol percent of the remainder consisting of methyl radicals, and a has an average value of from 1.9 to 2.1,
   (2) from 10 to 70 parts by weight of an organopolysiloxane resin, having a softening point of from 70 to 150° C., represented by the average unit formula $$(CH_3)_b(C_6H_5)_c(CH_2=CH)_d SiO_{\frac{4-b-c-d}{2}}$$

where b has a value of from 0.3 to 1.0, c has a value of from 0.3 to 1.5, and d has a value of from 0.001 to 0.05, with the proviso that the sum of b plus c plus d is a value of from 1.2 to 1.8,
   (3) from 0.1 to 10 parts by weight of an organohydrogen polysiloxane represented by the average unit formula $$(H)_e(R')_f SiO_{\frac{4-e-f}{2}}$$

where R' is a monovalent hydrocarbon radical, e has a value equal to or greater than 0.1, and f has such a value that the sum of e plus f is from 1.0 to 2.1,
   (4) a catalytic amount of a platinum-containing catalyst, and
   (5) from 10 to 60 parts by weight of a filler.

3. The composition of matter as claimed in claim 1 wherein said platinum-containing catalyst is selected from the group consisting of finely divided platinums, chloroplatinic acids, platinum-olefin complex, and reaction products of a chloroplatinic acid with either an alcohol, an ether, or an aldehyde.

4. The composition of matter as claimed in claim 1 wherein said platinum-containing catalyst is present in a range sufficient to provide from 0.01 to 10 p.p.m. of platinum by weight based on the total weight of said diorganopolysiloxane gum.

5. The composition of matter as claimed in claim 2 wherein said platinum-containing catalyst is selected from the group consisting of finely divided platinums, chloroplatinic acids, platinum-olefin complex, and reaction products of a chloroplatinic acid with either an alcohol, an ether, or an aldehyde.

6. The composition of matter as claimed in claim 2 wherein said platinum-containing catalyst is present in a range sufficient to provide from 0.01 to 10 p.p.m. of platinum by weight based on the total weight of said diorganopolysiloxane gum.

References Cited

UNITED STATES PATENTS

| | | | |
|---|---|---|---|
| 3,498,945 | 3/1970 | Leford et al. | 260—37 SB |
| 3,677,981 | 7/1972 | Wade et al. | 260—825 X |

LEWIS T. JACOBS, Primary Examiner

U.S. Cl. X.R.

260—46.5 G, 825